United States Patent [19]

Nukada et al.

[11] Patent Number: 4,677,505

[45] Date of Patent: Jun. 30, 1987

[54] TAPE RECORDER HEAD POSITION CONTROLLING DEVICE

[75] Inventors: Hideki Nukada, Tokyo; Atsushi Takahashi, Yokohama, both of Japan

[73] Assignee: Kabushiki Kaisha Toshiba, Kawasaki, Japan

[21] Appl. No.: 646,231

[22] Filed: Aug. 31, 1984

[30] Foreign Application Priority Data

Dec. 12, 1983 [JP] Japan ................. 58-232646

[51] Int. Cl.$^4$ ............................................. G11B 21/10
[52] U.S. Cl. ...................................... 360/77; 360/109
[58] Field of Search ................... 360/77, 107, 109, 75

[56] References Cited

U.S. PATENT DOCUMENTS 4,307,426 12/1981 Aldenhoven ...................... 360/109
4,392,163  7/1983 Rijckaert ...................... 360/109 X

FOREIGN PATENT DOCUMENTS 0032660 7/1981 European Pat. Off. .
2008290 5/1979 United Kingdom .

OTHER PUBLICATIONS

Proceedings of a Study Meeting of Electronic Audio Institute of Electronic Communications of Japan, EA-81-64.
Proceedings of a Study Meeting of Electronic Audio Institute of Electronic Communication of Japan, EA-82-47.
Proceedings of the Acoustical Society of Japan, 2-1-17(1982).

Primary Examiner—A. J. Heinz
Attorney, Agent, or Firm—Schwartz, Jeffery, Schwaab, Mack, Blumenthal & Evans

[57] ABSTRACT

A head position controlling device adjusts the position of the head so as to maintain a prescribed relative positional relationship between the magnetic tape and the head. This head position controlling device includes a moving mechanism which moves the head in the lateral direction of the magnetic tape and a tracking circuit for reproduction which controls the head moving mechanism so as to cause during reproduction the head to follow a plurality of the recorded tracks formed on the magnetic tape. This head position controlling device further includes a tape position detecting device which detects the position variations of the magnetic tape relative to the head without making contact with the tape, and a tracking circuit for recording which controls the head moving mechanism in such a way as to cause the head to follow the lateral motion of the tape in order to maintain the running position of the magnetic tape on the head to be fixed, corresponding to the position variations of the magnetic tape detected by the tape position detecting device during recording.

14 Claims, 4 Drawing Figures

U.S. Patent   Jun. 30, 1987   Sheet 1 of 2   4,677,505
FIG. 1
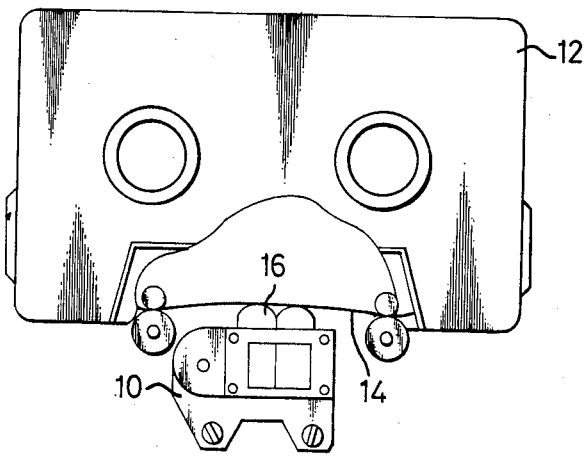
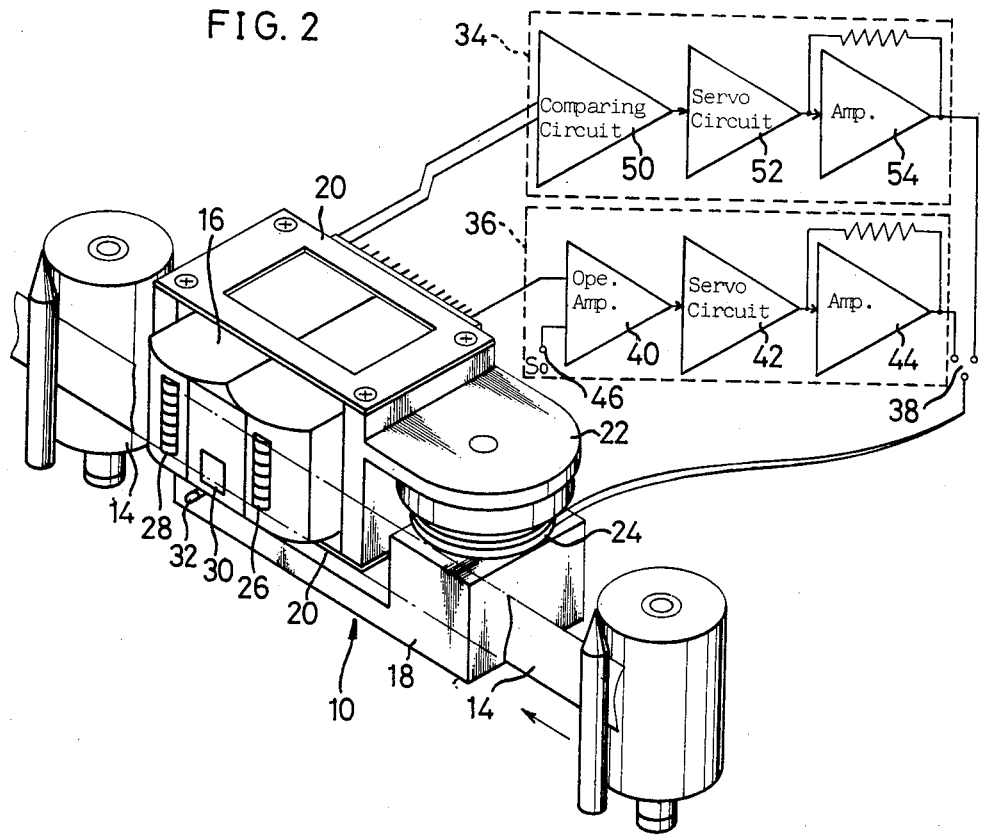
FIG. 2

TAPE RECORDER HEAD POSITION CONTROLLING DEVICE

BACKGROUND OF THE INVENTION

1. Field of the Invention

The present invention relates to a head position controlling device for tape recorders, more particularly, to a head position controlling device for tape recorders which employ the PCM recording system.

2. Description of the Prior Art

In recent years, the PCM recording system, replacing the conventional analog recording system, is being put into practical use for cassette tape recorders in order to realize recording and reproduction of high quality voice signals by securing a wide dynamic range without being affected by wow and flutter and by noise. The PCM recording system is a system which records voice signals on a magnetic tape by encoding the waveform according to whether there is a pulse or not, and reverts the codes pulses to the original voice signals at the time of reproduction.

In the PCM recording system, in order to make it possible to record and reproduce voice signals in the audio range of frequencies (between about 20 Hz and about 20 kHz), it is necessary in general to process information content of the order of several mega bits per second. For processing this much information in a short time, there are proposed several methods of recording and reproduction. One of such methods is the multi-track recording and reproducing system. This is a system in which the recording head is constructed in a stacked form in the lateral direction of a magnetic tape in order to make it possible to form a plurality of parallel recorded tracks in the direction of the magnetic tape. The reproducing head is also constructed, analogous to the recording head, in a stacked form in the lateral direction of the magnetic tape in order to correspond to the plurality of recorded tracks that are formed by the recording head. In this system, recording is made by means of the recording head by recording the encoded voice signals on each of the tracks, and reproduction is made by means of the reproducing head by reproducing the encoded voice signals on each of the tracks. Because of the circumstances described above, the width of the recording track is extremely narrow, somewhere between several tens of μm and one hundred μm.

Furthermore, in view of making the tape recorder small in size, making the units compatible in recording and reproduction, and the like, the recording head and the reproducing head are generally either of the type where the recording head serves also as the reproducing head or of the type where both heads are put into a single unit, the so-called combined head, moving in an interlocked manner.

In a casette tape recorder with the PCM recording system, it is apt to produce a relative slip in position between the magnetic tape and the head, due to outside vibrations acting on the magnetic tape and the head or to the accuracy of the running mechanism of the magnetic tape, or the like. Accordingly, at the time of recording and reproduction, the magnetic tape meanders relative to the head. However, the head runs off the recording tracks over which it should run under normal conditions and runs into the contiguous recording tracks, because the recording track has a very narrow width, as mentioned earlier, and the spacing between the neighboring recording tracks is less than the width of each track being of the order of several tens of μm.

The servo tracking method is known as one of the countermeasures against the above problem. This is a method of forming a servo track at the time of recording and independent of the information tracks, and moving the head following the servo track at the time of reproduction in order to prevent the running-off of the head from the recorded tracks.

However, in the servo tracking method described above, the meandering of the magnetic tape that arises during recording will be recorded as is on the recording tracks and the servo track, since there are recorded on the magnetic tape no tracks that can be used as guide during recording.

Consequently, excessive load is placed on the tracking servo mechanism during reproduction, causing sometimes a run off of the head from the recorded tracks.

Furthermore, when a tape, which has already been recorded and reproduced on a recorder and has been taken out of the recorder, is subsequently placed in a recorder for reproduction, the positioning error is at least several tens of μm so that it has been difficult to insure the reproducibility of the positioning accuracy of the corresponding positions between the magnetic tape and the head.

In addition, another countermeasure against the existing problem, that has been proposed is a method for improving the reproducibility of the relative positioning relationship between the tape and the head. According to the method, there is provided on the cassette or the recorder itself a guiding member which serves to restrict the running range of the magnetic tape by making direct contact with the edge of the magnetic tape at the intake side of the tape into the head. However, in a method of this kind, the edge of the magnetic tape in recording is forcibly position controlled by the guiding member so as to run on the head by contacting it at a prescribed relative position, so that there is a danger of creating buckling on the tape during recording due to the load acting on the tape. When buckling is formed, the meandering of the recording tracks becomes substantial so that an excess burden is placed on the tracking servo mechanism of the head. Also, even under reproduction with the servo tracking device there are drawbacks such as the reduction in the level of reproduced signals or even the impossibility of reproduction. Even when no buckling is formed during recording, the wear of the magnetic tape edges will increase under forced control on the running range of the magnetic tape in repeated reproductions such that either buckling apt to be formed or slips in relative positions are introduced after use over extended period, leading to a reduction in the reliability of the signal reproduction.

SUMMARY OF THE INVENTION

An object of the present invention is to provide a head position controlling device for tape recorders which allows recordings and reproductions of higher quality.

Another object of the present invention is to provide a head position controlling device for tape recorders which prevents relative position slips between the magnetic tape and the head without placing any load on the magnetic tape.

Another object of the present invention is to provide a head position controlling device for PCM tape recorders which prevents the running-off of the head from the recording tracks.

Another object of the present invention is to provide a head position controlling device for PCM tape recorders which allows staight line recordings for the servo tracks and the recording tracks.

Another object of the present invention is to provide a compact head position controlling device which can also utilize a conventional servo tracking mechanism.

Another object of the present invention is to provide a head position controlling device which makes it possible to extend the life of the tape.

Briefly described, these and other objects of the present invention are accomplished by the provision of an improved tape recorder head position controlling device in which, for recording, information on position variations of the magnetic tape with respect to the head is detected at the edge of the magnetic tape without making actual contact with it, and the recording of information and information on the servo track that is to be utilized at the time of reproduction are carried out based on the detected information on the magnetic tape position. For reproduction, the operation is executed according to the servo track information obtained previously, by driving the means which moves the magnetic tape and the head in order to maintain a prescribed relative position between the magnetic tape and the head.

BRIEF DESCRIPTION OF THE DRAWING

These and other objects, features, and advantages of the present invention will be more apparent from the following description of a preferred embodiment, taken in conjunction with the accompanying drawing in which:

FIG. 1 is a simplified plan view of a head driving section of a head position controlling device embodying the present invention;

FIG. 2 is an enlarged perspective view and a circuit diagram of a head driving section of a head position controlling device embodying the present invention;

DESCRIPTION OF THE PREFERRED EMBODIMENTS

Figure 3:
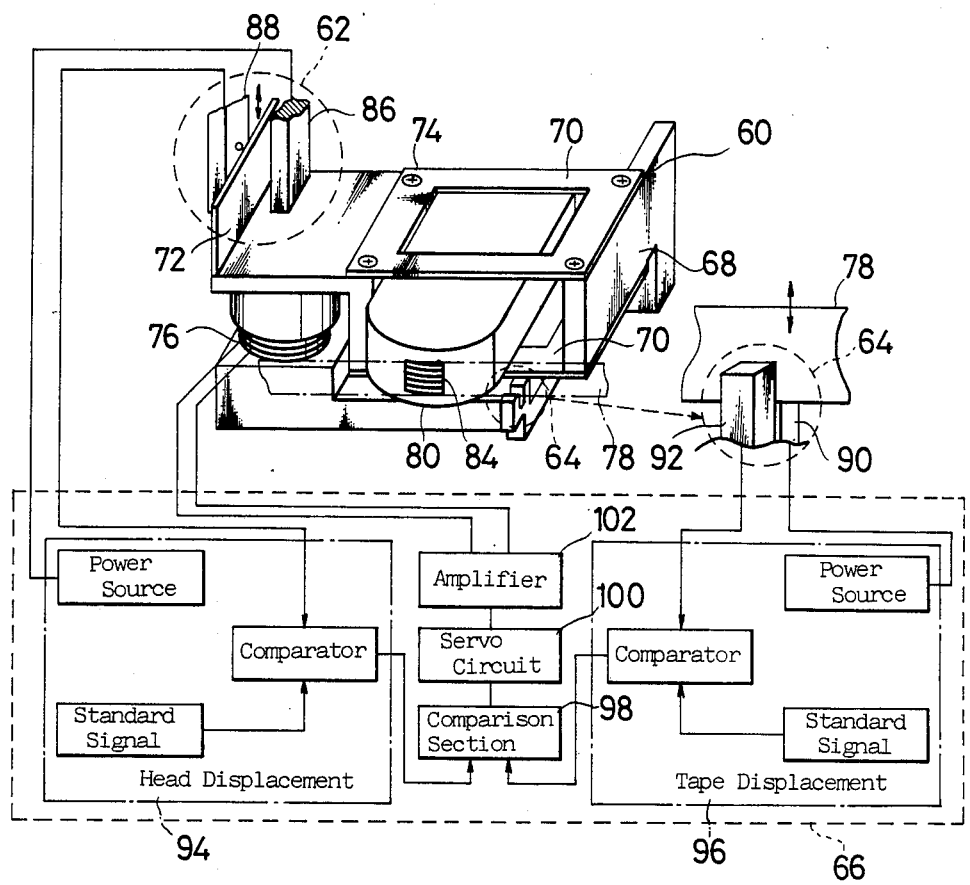
FIG. 3 is a perspective view and a circuit diagram of another embodiment of the head position controlling device according to the present invention.

Referring now to FIG. 1, there is shown a head driving section of a head position controlling device embodying the present invention with the reference numeral 10, wherein the head driving section 10 supports a head 16 which records and reproduces the voice signals on a magnetic tape 14 of a cassette 12.

Referring to FIG. 2, the head driving section 10 includes a pair of parallel plane springs 20 which are installed to a head holding section 22 so as to arrange the head 16 between the parallel plane springs 20. The head holding section 22 is connected to a voice coil motor 24 which is arranged on a block 18, and is made movable in the lateral direction of the tape 14 with the voice coil motor 24 as the actuator. Namely, when the head holding section 22 moves, the parallel plane springs 20 bend, and at the same time, the head 16 is moved in the lateral direction of the tape 14. The head 16 comprises a recording head 26 and a reproducing head 28 which are arranged adjacent to the running path of the tape 14, each having a structure stacked along the lateral direction of the tape 14. In between these two heads 26, 28 there is formed a tape position detecting section which comprises a light receiving device 30 and a light source 32. The reproducing head 28 is connected to a tracking circuit 34 for reproduction which will cause the head 16 to track the tape 14 during reproduction. Further, the light receving device 30 is connected to a tracking circuit 36 for recording which will cause the head 16 to move following the motion in the lateral direction of the tape 14 corresponding to the meandering motion of the tape 14, in order to maintain the same running position of the tape 14 relative to the head during recording. The outputs from both tracking circuits 34 and 36 are connected to the voice coil motor 24 via a circuit changing switch 38. The light receiving device 30 has a prescribed area for light reception, and outputs signals upon receipt of light from the light source 32. When the tape 14 is found at a prescribed position on the head 16, it is so arranged that the light receiving section will always be shielded by the tape for the prescribed amount of area along the lateral direction of the tape. Therefore, the output signal of the light receiving device 30 under these conditions has a constant level So. Accordingly, if the tape meanders while running by making contact with the head, the light receiving area of the light receiving devic 30 varies corresponding to the change in the position of the tape edge on the head 16 due to the meandering, with the result that the output signal of the light receiving device 30 varies in accordance with the position change in the tape edge corresponding to the meandering.

The tracking circuit 36 for recording comprises an operational amplifier 40, a servo circuit 42, and an amplifier 44. One input terminal of the operational amplifier 40 is connected to the light receiving device 30 while the other input terminal is connected to a reference power terminal 46 which possesses the same level So as the level of signal output by the light receiving element 30 when the tape is found at a prescribed position relative to the head 16. Due to this arrangement, the output signals of the operational amplifier 40 correspond to the position variations of the tape (its edge) on the head 16. Based on the output of the operational amplifier 40, the servo circuit 42 generates controlling signals for maintaining all the time a prescribed positional relationship of the tape 14 relative to the head 16, which causes the head 16 to follow the lateral motion of the tape 14 by means of the operation of the voice coil motor 24, corresponding to the position variations of the tape 14 on the head 16. The amplifier 44 amplifies the controlling signals to the level necessary for driving the voice coil motor 24, and the resulting voice coil current is output to the voice coil motor 24 via the circuit changing switch 38.

The tracking circuit 34 for reproduction comprises a track signal comparing circuit 50, a servo circuit 52, and an amplifier 54. The input terminal of the track signal comparing circuit 50 is connected to the reproducing head 28 which has the stacked structure, so as to be able to receive the reproduced signals from the two predetermined reproducing heads of the stacked structure. The two reproducing heads are arranged adjacent to, and so as to have a normally constant contact area with, the track for the tracking servo system which is formed by the recording head 26 and is recorded with fixed signals. Hence, the reproduced signals from the two heads will be equal if both reproducing heads are in normal positions relative to the track for the tracking servo system. Therefore, the output signal of the track signal comparing circuit 50 corresponds to the deviation in the levels of the reproduced signals from the track for the tracking servo system, in other words, to the slip of the tape 14 relative to the position of the head 16 during the running of the tape for reproduction. The servo circuit 52 generates controlling signals based on the output signal of the track signal comparing circuit 50 to let the tape 14 maintain a prescribed relationship with respect to the position of the head 16, by operating the voice coil motor 24 in accordance with the position variations of the tape 14 on the head 16. This causes the head 16 to follow the lateral motion of the tape 14. The amplifier 54 amplifies the controlling signals to the level necessary to drive the voice coil motor 24, and outputs the resulting voice coil current to the voice coil motor 24 via the circuit changing switch 38.

The operation of the present embodiment of the device will now be illustrated.

First, the operation during recording will be explained. When recording starts by setting a blank cassette in the recorder (not shown in the figure), the head 16 makes contact with the tape 14 by means of the head set mechanism which is not shown in the figure, and the tape 14 starts to run by keeping contact with the head 16. At the same time, the tracking circuit 36 for recording starts to be driven, and the operation of the circuit changing switch 38 brings about an electrical connection between the amplifier 44 and the voice coil motor 24. Due to driving of the tracking circuit 36 for recording, the operational amplifier 40 outputs signals of the light receiving device 30, that is, signals corresponding to the deviations in the position of the tape 14 from a prescribed position on the head 16. Therefore, the servo circuit 42 and the amplifier 44 output a voice coil current to the voice coil motor 24 to cancel the signal which corresponds to the deviation in the position. The voice coil motor 24 moves the head holding section 22 in the lateral direction of the tape 14 in response to the voice coil current. Together with this motion, the head 16 is moved in the same direction while being held by the parallel plane springs 20. As a result, the relative positions between the head 16 and the tape 14 remain constant regardless of the meandering running of the tape, forming the recorded tracks on the tape 14 with little meandering.

Next, the operation during reproduction will be described. When reproduction starts by setting a recorded cassette in the recorder, the head 16 makes contact with the tape 14 by means of the head set mechanism, similar to the case of recording, and the tape starts to run by keeping contact with the head 16. At the same time, the tracking circuit 34 for reproduction starts to be driven, and the amplifier 54 and the voice coil motor 24 are connected electrically by the operation of the circuit changing switch 38. Due to the operation of the tracking circuit 34 for reproduction, the track signal comparing circuit 50 outputs signals corresponding to the differences in signals coming from the two prescribed reproducing heads for tracking servo system, that is, signals corresponding to the position deviations of the reproducing head 28 relative to the recorded tracks. Because of these signals, the servo circuit 52 and the amplifier 54 output voice coil currents, which cancel the signals that correspond to the above position deviations, to the voice coil motor 24. The voice coil motor 24 operates in response to the voice coil current and moves the head holding section 22 to the lateral direction of the tape 14. Because of this, the head 16 supported by the parallel plane springs 20 is moved in the same direction. As a result, even if the recorded tracks on the tape 14 have some fine meanderings, the reproducing head 28 follows the meanderings of the tracks so that the reproduction can be continued satisfactorily without apparent distortion.

In FIG. 3 there is shown another embodiment of the head position controlling device according to the present invention. The special feature of the embodiment is that it is arranged to have the displacement of the head, which is movable in the lateral direction of the tape, from the reference position for the head remain equal to the displacement of the tape from the reference position for the tape. The tape reference position is defined as the position of the tape on the head corresponding to the situation where the head is located at the reference position for the head.

As shown in FIG. 3, this head position controlling device includes a head driving section 60, a head position detecting section 62, a tape position detecting section 64, and a head position controlling circuit 66.

The head driving section 60 includes a pair of parallel plane springs 70 which are installed in a block 68. The parallel plane springs 70 hold a head holding section 74 which has a protrusion 72 which can move either as a single unit with or keep a prescribed positional relationship with the parallel plane springs 70. The head holding section 74 is connected to a voice coil motor 76 which is installed in the block 68, and is movable in the lateral direction of the tape by the voice coil motor 76 as the actuator. Namely, when the motion of the head holding section 74 is transmitted to the parallel plane springs 70, the parallel plane springs 70 bend to let the head 80 move in the lateral direction of the tape 78, as will be explained later. In between the parallel plane springs 70 there is arranged a head section 80. The head section 80 includes a head 84 which has a stacked construction in the lateral direction of the tape 78. The head 84 fulfills both the recording and reproducing functions.

The head position detecting section 62 comprises a light source 86 and a photoelectric conversion device 88 which are arranged to sandwich the protrusion 72. The light source 86 and the photoelectric conversion device 88 are arranged in such a way to have the rate of obstruction of light passage from the light source 86 to the photoelectric conversion device by the protrusion 72 to be constant for a situation where the head 80 is found in a prescribed state, for example, when there is no bending of the parallel plane springs 70. Consequently, the output signal from the photoelectric conversion device 88 for such a state will remain constant. However, when the protrusion 72 moves with the motion of the head holding section 74, the rate of obstruction of the light passage by the protrusion 72 varies, with the result that the output signal from the photoelectric conversion device 88 varies also. Namely, the variation in the output signal of the photoelectric conversion device 88 corresponds to the distance over which the head section 80 moved in the lateral direction of the tape 78.

The tape position detecting section 64 comprises a light source 90 and a photoelectric conversion device 92 which are arranged to sandwich the tape 78.

The light source 90 and the photoelectric conversion device 92 are arranged to have the rate of obstruction of light passage from the light source 90 to the photoelectric conversion device 92 by the edge of the tape 78 remain constant for a prescribed state of the head section 80, for example, when there is no bending of the parallel plate springs 70. Therefore, the output signal from the photoelectric conversion device 92 is constant and is set to be identical to the level of the output from the photoelectric conversion device 88 under such a condition. When the tape 78 meanders 80, the rate of obstruction of light passage by the edge of the tape 78 varies, resulting in the output signal from the photoelectric conversion device 92 varying also. The variation of the output signal corresponds to the distance over which the tape 78 moved in the lateral direction of the tape relative to the head section 80.

The head position controlling circuit 66 maintains for all times the prescribed relationship of the head 84 relative to the position of the tape 78, by causing the head 84 to move following the lateral motion of the tape 78 through operation of the voice coil motor 76 in response to the position variation of the tape 78 on the head 84. The controlling circuit 66 comprises a head displacement calculating circuit 94, a tape displacement calculating circuit 96, a comparsion section 98, a servo circuit 100, and an amplifier 102. The head displacement calculating circuit 94 is connected to the photoelectric conversion device 88 of the head position detecting section 62, and calculates the displaced distance of the head section 80. The tape displacement calculating circuit 96 is connected to the photoelectric conversion device 92 of the tape position detecting section 64, and calculates the displaced distance of the tape 78. Both of the input terminals of the comparison section 98 are connected to the two calculating circuits 94 and 96 which calculate the difference between the displaced distance of the head 80 and the displaced distance of the tape 78, and outputs the result to the servo circuit 100. The servo circuit 100 calculates the controlling signal which cancels the difference in distances by moving the head section 80 in the lateral direction of the tape 78 through operation of the voice coil motor 76 corresponding to the difference in the distances. The amplifier 102 amplifies the controlling signal to the level necessary to drive the voice coil motor 76, and outputs the result to the voice coil motor 76.

The operation of this embodiment will now be described.

Upon starting the running of tape 78 over the head 84 for recording, the head position detecting section 62, the tape position detecting section 64, and the head position controlling circuit 66 start to operate at the same time. When the tape 78 runs over the head 84 at a prescribed position, the output signals from the photoelectric conversion devices 88 and 92 for the head position detecting section 62 and the tape position detecting section 64, respectively, show identical levels. The output of the comparison section 98 of the head position controlling circuit 66 in this situation is zero, whereby the servo circuit 100 and the amplifier 102 stay unactuated.

On the other hand, if the tape 78 meanders during recording, the output signal of the photoelectric conversion device 92 of the tape position detecting section 64 varies in response to the meandering. Consequently, the output level of the comparison section 98 becomes non-zero. Upon receipt of the output signal from the comparison section 98, the servo circuit 100 and the amplifier 102 actuate the voice coil motor 76 to bring the output of the head position detecting section 62 to be on the same level as the output of the tape position detecting section 64, and eventually moves the head 84 in the lateral direction of the tape 78. By moving the head 84 in response to the meandering running of the tape 78, it becomes possible to maintain a constant position of the tape 78 on the head 84 during recording. This forms recorded tracks on the tape 78 where there is little indication of meandering.

Figure 4:
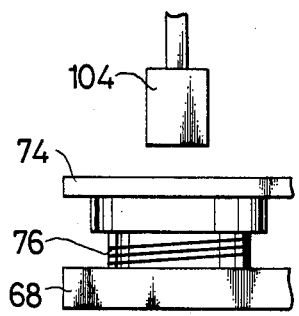
FIG. 4 is a simplified construction diagram which illustrates another method of detecting the head position for the embodiment shown in FIG. 3.

It should be mentioned that, though in the present embodiment an optical detection system was employed for the head position detecting section 64, it is not limited to this type of system but some other system, such as the one employing a gap sensor 104 which detects the eddy current, as shown in FIG. 4, can also serve the same purpose.

In summary, according to the present invention, the relative position between the magnetic tape and the head during recording is maintained by detecting the displacement of the edge of the running tape without forcibly controlling the tape edge, by employing a means for insuring the relative positioning between the head and the tape during reproduction, so that it is possible to form recorded tracks which show almost no indication of meanderings by absorbing the meandering of the tape due to manufacturing accuracy of the tape running mechanism. Consequently, during reproduction, it is possible to reduce the burden on the servo system to an extremely low level, since there is almost no indication of the meanderings in the servo track and the amount of servo required is only that for taking care of the manufacturing accuracy for the mechanism of running the tape.

Various modifications will become possible for those skilled in the art after receiving the teachings of the present disclosure without departing from the scope thereof.

What is claimed is:

1. A tape recorder head position controlling device for controlling a head position relative to a magnetic tape, comprising:
   (a) a tape position detecting unit including a first light source and a first light sensor, said first light sensor being so arranged that a prescribed amount of area of said first light sensor is shielded by part of the tape including an edge thereof along the lateral direction of the tape;
   (b) means responsive to said tape position detecting unit and a predetermined constant reference voltage level for generating a signal representative of positional variations of the tape edge on the head;
   (c) a servo circuit responsive to the positional variation signal from said means responsive to said tape position detecting unit for generating a control signal; and
   (d) means for moving the head in response to said control signal to such a position that a prescribed amount of area of said sensor can be shielded by the tape.

2. The tape recorder head position controlling device as claimed in claim 1, comprising a single tape position detecting unit.

3. A head position controlling device as claimed in claim 1, wherein said head moving means comprises a holding member for holding the head in a movable position in the lateral direction of the magnetic tape, and an actuator which is installed relative to the head in the running direction of the magnetic tape for moving the head in the lateral direction of the magnetic tape by acting on the holding member in the lateral direction of the magnetic tape.

4. A head position controlling device as claimed in claim 3, wherein the holding member comprises a pair of plane springs arranged parallel and opposing each other in the lateral direction of the magnetic tape.

5. A head position controlling device as claimed in claim 3, wherein said actuator comprises a voice coil motor.

6. A head position controlling device as claimed in claim 1, wherein said first light source and said first light sensor detect the positional variations of the magnetic tape as the positional variations of the edge of the magnetic tape.

7. The tape recorder head position controlling device as claimed in claim 1, further including:
- a head position detecting unit including a second light source and a second light sensor, said second light sensor being so arranged that a prescribed amount of area of said second light sensor is shielded by an edge of a head supporting member;
- means responsive to said head position detecting unit for generating a signal representative of positional variations of the head supporting member;
- means responsive to said signal representative of positional variations of the tape edge and said signal representative of positional variations of the head supporting member for generating a comparison signal, wherein said servo circuit is responsive to said comparison signal for generating said control signal.

8. A tape recorder head position controlling device for controlling a head position relative to a magnetic tape comprising:
- (a) a tape position detecting unit including a first light source and a first light sensor for generating a signal indicative of the tape position, said first light sensor being so arranged that a prescribed amount of area of said first light sensor is shielded by part of the tape including an edge thereof along the lateral direction of the tape;
- (b) a head position detecting unit including a second light source and a second light sensor for generating a signal indicative of the head position, said second light sensor being so arranged that a prescribed amount of area of said second light sensor is shielded by an edge of a head supporting member;
- (c) a comparison section responsive to said tape position detecting unit and said head position detecting unit for generating a difference signal between said tape position signal and said head position signal;
- (d) a servo circuit responsive to said difference signal for generating a control signal; and
- (e) means for moving the head in response to said control signal to such a position that a prescribed amount of area of said sensor is shielded by the tape.

9. A head position controlling device as claimed in claim 8, wherein said head moving means comprises a holding member for holding the head in a movable position in the lateral direction of the magnetic tape, and an actuator which is installed relative to the head in the running direction of the magnetic tape for moving the head in the lateral direction of the magnetic tape by acting on the holding member in the lateral direction of the magnetic tape.

10. A head position controlling device as claimed in claim 9, wherein the holding member comprises a pair of plane springs arranged parallel and opposing each other in the lateral direction of the magnetic tape.

11. A head position controlling device as claimed in claim 9, wherein said actuator comprises a voice coil motor.

12. A head position controlling device as claimed in claim 8, wherein said first light source and said first light sensor detect the positional variation of the magnetic tape as the positional variation of the edge of the magnetic tape.

13. A head position controlling device as claimed in claim 8, wherein said tape position detecting unit further includes:
- means for producing a first reference signal; and
- means for comparing said first reference signal with a signal indicative of said prescribed amount of area of said first light sensor for generating said tape position signal.

14. A head position controlling device as claimed in claim 8, wherein said head position detecting unit further includes:
- means for producing a second reference signal; and
- means for comparing said second reference signal with a signal indicative of said prescribed amount of area of said second light sensor for generating said head position signal.

* * * * *